(No Model.)

S. C. ROGERS & J. T. BARNARD.
MACHINE FOR GUMMING AND SHARPENING SAWS.

No. 299,583. Patented June 3, 1884.

Witnesses
B. Bruce
Wm. B. Coles.

Inventors
S. C. Rogers
J. T. Barnard
By W. Bruce
Att'y

UNITED STATES PATENT OFFICE.

SAMUEL C. ROGERS AND JAMES T. BARNARD, OF HAMILTON, ONTARIO, CANADA.

MACHINE FOR GUMMING AND SHARPENING SAWS.

SPECIFICATION forming part of Letters Patent No. 299,583, dated June 3, 1884.

Application filed June 18, 1883. (No model.)

*To all whom it may concern:*

Be it known that we, SAMUEL COLEMAN ROGERS and JAMES TELFER BARNARD, both of the city of Hamilton, in the county of Wentworth, in the Province of Ontario, Dominion of Canada, have jointly invented certain new and useful Improvements in Machines for Gumming and Sharpening Saws; and we do hereby declare that the following is a full, clear, and exact description of the construction and operation of the same.

Figure 1:
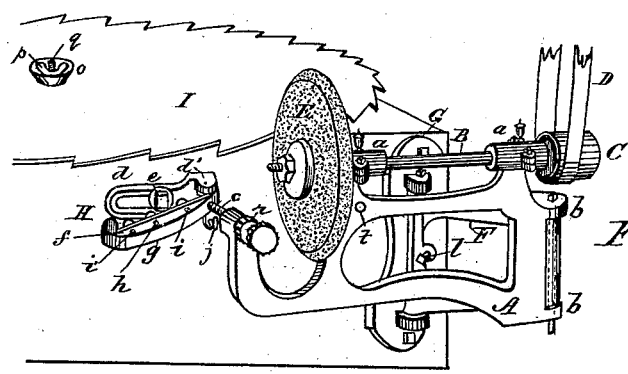
Figure 2:
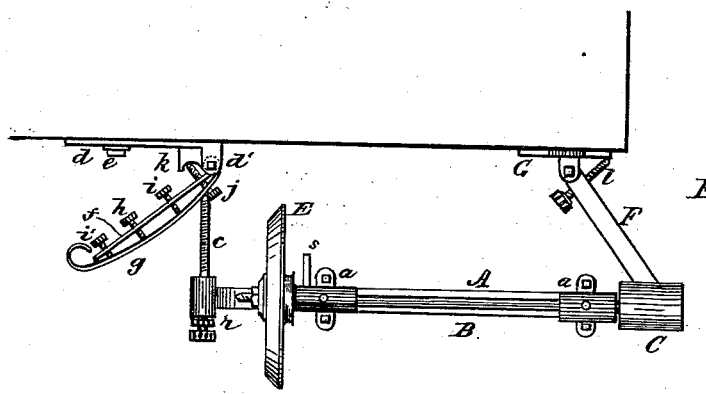
Figures 3, 4:
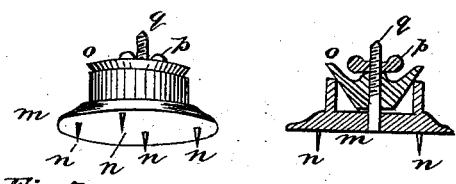
Figure 5:
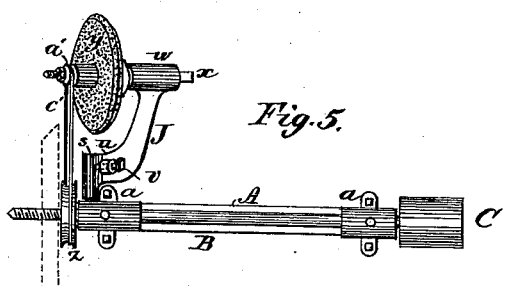

Reference being had to the drawings forming part of this specification, it will be seen that Figure 1 is a perspective view of the machine. Fig. 2 is a top view. Fig. 3 is a perspective view of chuck to hold a saw to a table while being gummed. Fig. 4 is a vertical section of the same. Fig. 5 is a top view of bevel-grinding attachment.

The invention relates to a very simple but handy and convenient device for gumming and sharpening saws, by which the operation is performed with speed and correctness, and so constructed as also to grind the teeth of cross-cut-saws on the required bevel.

By reference to the drawings, A, Fig. 1, is a movable frame, carrying a journaled spindle, B, on its upper part, which passes through the boxing $a\,a$. One end of the spindle is provided with a driving-pulley, C, around which the belt D passes, and on the other end of said spindle is affixed an emery or corundum wheel, E, for grinding saws. A small frame, F, is hinged to one end of the said movable frame A by the lugs $b\,b$, which form part of the frame, and the other end of the said frame F is similarly hinged to a vertical casting, G, which is bolted to a bench or table which supports the saw to be operated upon, and is for the purpose of allowing the movable frame A, carrying the wheel, to be moved in any horizontal direction, and the motion of it is such as to keep the spindle parallel with the table as the wheel is passed up the back of the tooth, at the same time keeping the belt on the pulley. The movable frame A terminates (at its left-hand end) in an upwardly-curved arm, the end of which is provided with a tapped opening, through which is made to pass an adjustable threaded stop-pin, $c$, (provided with a lock-nut, $r$,) which is made to impinge against an adjustable guide-frame, H, fastened to a table or bench on a line horizontally with the casting G. The said guide-frame consists, first, in a slotted plate, $d$, secured to the table by a bolt, $e$, passing through the slot, and thus enabling the said plate to be shifted at pleasure as the grinding-wheel wears away. $f$ is a guide-arm hinged to the lug $d'$ of the slotted plate $d$, and on the right side of the said guide-arm $f$ is a flat spring, $g$, which passes around both ends of the arm. The bend or curve of the said spring is adjusted by the thumb-screws $h\,i\,i'$, which pass through the arm $f$ and impinge against the inner side of the spring, and by this means a nice adjustment of the said spring can be obtained, as may be required. The arm $f$ is held at the proper angle by means of a thumb-screw, $j$, passing through its nearest end and impinging on a projection, $k$, cast on the plate $d$. By turning the said screw in or out the proper angle can be given to the said arm $f$, while the other thumb-screws, $h\,i\,i'$, give the fine adjustment to the spring $g$. It will thus be seen that the grinding-wheel E is guided during its action by the adjustable stop-pin $c$, sliding along the face of the spring $g$ at any angle it may be set to, thus enabling the operator at will to produce any shape of tooth in a saw.

$l$ is an adjustable stop-screw passing through the vertical part of the frame F, and made to impinge against a projection on the base-plate G, and is for the purpose of adjusting the said frame F to any desired angle to allow the spindle B, which carries the grinding-wheel, to be adjusted parallel with the table as the grinding-wheel wears away.

I, Fig. 1, is a saw in position for being operated on. It is secured to the top of a table by a chuck device. (Shown at Figs. 3 and 4.) It consists of a circular base, $m$, provided on its under side with spikes $n$. Its upper part is hollow. The top of it is level, and the saw is placed upon it with its central opening over the hollow in the base. A cone, $o$, is then placed, with the small end down, into and through the central saw-opening into the recess in the base, and a nut, p, screwed on the threaded pin q, which projects upward from the base m through the cone. The saw is thus held between the two parts and placed on the table in the required position, and the spikes n of the base sink into the table, which prevents the saw from moving as the teeth are operated on by the wheel.

By reference to Fig. 5 will be seen the attachment for grinding the teeth of crosscut-saws any desired bevel.

s is a cylindrical pin, secured by a bolt, t, to the inside of the frame A. It is Γ-shaped, and its upper part projects inward at right angles to the said frame A. On the said pin is placed an arm, J, provided with a socket, u, which slips over the said pin s, and fastened thereto at any angle by a set-screw, v, as shown at Fig. 5. The outer end of the arm J is provided with a bearing, w, which carries a spindle, x, upon which is secured a small emery-wheel, y, which revolves on it, and is driven by a belt, c', passing over the pulley z on the spindle B, and a small pulley, a', on the spindle x. By this device it will be seen that the wheel y can be set to any desired angle to grind the teeth of crosscut-saws on the bevel, and when it is used the large wheel E is removed, as at Fig. 5, the dotted lines showing its position on the shaft B. Of course when the large wheel is employed the small one, y, is removed.

A few of the advantages of our device may be stated in order to more fully explain it.

We are aware that saw gummers and sharpeners have been used having a grinding-wheel attached to a sliding spindle, one objection to which is, the wheel is removed too far from the boxing and produces an irregular motion, and in order for the shaft to slide easily the boxing must be somewhat loose around it, which allows particles of emery and steel to enter and lodge in the boxing, which soon wears the shaft and boxing, and also prevents the wheel from running true. Our device having no sliding spindle, the wheel E is always close to the boxing, and is a closer fit around the shaft, and the double hinge allows of any desired length of parallel motion of spindle with the table carrying the saw. The device will gum any saw—circular, gang, drag, or crosscut—and gum and sharpen any rip-saw, from the smallest size to those six feet in diameter, and at the same time it will not overheat or case-harden the saw. It is so simple that it is easily handled, and the operator has complete control of the wheel during the entire operation of gumming or sharpening, and every tooth in a saw can be ground exactly alike, and any shape of tooth can be produced.

The bevel-grinding attachment can be easily attached when required to grind crosscut-saws on the bevel, and the machine combines within itself in a simple form the capacity to execute three classes of work—viz., straight grinding, gumming, and bevel grinding.

To make a part of the machine more fully understood, we may observe that the arm f is shown straight in the drawings; but it could be curved, or templets formed and attached to it, to aid in producing any desired form of saw-tooth, in lieu of the spring g shown; but we prefer the latter, as the curve required can be so quickly and nicely adjusted by the thumb-screws behind it; but it will also be observed that the said spring g is (although so called) in reality not a spring, notwithstanding it is made out of spring metal. It may be more properly called an "adjustable templet," whose purpose is to give any desired curve by one or more thumb-screws or their equivalent, three of which are shown in the drawings, to adjust the curve of the templet to any corresponding form of teeth desired to be formed by the grinding-wheel.

Having thus described our device and its advantages, what we claim as our invention, and desire to secure by Letters Patent, is—

1. In a saw gummer and sharpener, the combination of the plate G, when secured vertically to its support, the frame F, attached thereto, the horizontally-movable frame A, and non-sliding spindle B, carrying the grinding-wheel E, to operate on a saw placed horizontally, substantially as shown and described.

2. In a saw gummer and sharpener, the combination of the hinged guide-arm f, slotted plate d, and the screw j, substantially as and for the purpose specified.

3. In a saw gummer and sharpener, the combination of the slotted plate d, the same being formed at one end with a lug, d', and projection k, the guide-arm f, hinged to the plate d, a spring, g, attached to guide-arm f, and made adjustable by thumb-screws h, i, and i', and a stop-screw, j, all constructed substantially as and for the purpose specified.

4. In a saw gummer and sharpener, the combination, with the guide-frame H and frame A, of the adjustable stop-pin c, provided with a lock-nut, r, substantially as and for the purpose specified.

5. In a saw gummer and sharpener, the saw-support having a circular spiked base-piece, m, the same being provided with a cone, screw-pin, and nut, all constructed to hold a saw while being gummed and sharpened.

6. In a saw-gummer, the combination, with arm J, of frame A, provided with pin s, spindle x, wheel y, and pulleys a' and z, for grinding wood and crosscut saws on a bevel, substantially as specified.

7. In a saw gummer and sharpener, the combination of a spring or templet, g, and guide-arm f, substantially as and for the purpose specified.

Dated at Hamilton, Ontario, Canada, this 2d day of May, A. D. 1883.

S. C. ROGERS.
     J. T. BARNARD.

In presence of—
 M. YOUNG,
 W. BRUCE.